(12) United States Patent
Borgen et al.

(10) Patent No.: US 8,787,111 B2
(45) Date of Patent: Jul. 22, 2014

(54) DEVICES AND METHODS FOR POSITIONING TOWS IN MARINE SEISMIC SYSTEMS

(75) Inventors: Lars Borgen, Sande (NO); Martin Howlid, Blommenholm (NO)

(73) Assignee: WesternGeco L.L.C., Houston, TX (US)

( * ) Notice: Subject to any disclaimer, the term of this patent is extended or adjusted under 35 U.S.C. 154(b) by 596 days.

(21) Appl. No.: 13/019,584

(22) Filed: Feb. 2, 2011

(65) Prior Publication Data

US 2012/0195162 A1    Aug. 2, 2012

(51) Int. Cl.
*G01V 1/38*    (2006.01)

(52) U.S. Cl.
CPC .................... *G01V 1/3826* (2013.01)
USPC ............................ 367/16; 367/17

(58) Field of Classification Search
CPC ............................. G01V 1/3826; B63B 21/663
USPC ............ 367/4, 16, 17, 18; 114/242, 253, 244, 114/246
See application file for complete search history.

(56) References Cited

U.S. PATENT DOCUMENTS

| | | | |
|---|---|---|---|
| 3,568,623 A * | 3/1971 | Gustavson et al. | 114/253 |
| 4,756,268 A * | 7/1988 | Gjestrum et al. | 114/242 |
| 4,757,482 A | 7/1988 | Fiske, Jr. | |
| 5,357,892 A | 10/1994 | Vatne et al. | |
| 5,835,450 A * | 11/1998 | Russell | 367/20 |
| 5,913,280 A | 6/1999 | Nielsen et al. | |
| 6,216,627 B1 | 4/2001 | Johnsen et al. | |
| 6,504,792 B2 * | 1/2003 | Barker | 367/20 |
| 7,577,060 B2 | 8/2009 | Toennessen et al. | |
| 7,658,161 B2 * | 2/2010 | Toennessen et al. | 114/246 |
| 2008/0029012 A1 | 2/2008 | Stokkeland | |
| 2010/0149910 A1 | 6/2010 | Martin | |

FOREIGN PATENT DOCUMENTS

WO        9900295        1/1999

OTHER PUBLICATIONS

International Search Report and Written Opinion of PCT Application No. PCT/US2012/023566 dated Sep. 5, 2012: pp. 1-9.

* cited by examiner

*Primary Examiner* — Isam Alsomiri
*Assistant Examiner* — Hovhannes Baghdasaryan

(57) ABSTRACT

A method and system for deploying seismic tows, such as seismic streamers, from a common carrier rope for conducting marine seismic surveys. The deployment system generally comprises a carrier rope having at least one deflector urging the carrier rope laterally relative to the towing vessel and seismic tows that are independently moveable along the deployed carrier rope to desired locations from which to be deployed. The carrier rope may be deployed from the tow vessel into the water prior to deploying the seismic streamer (s) into the water.

17 Claims, 4 Drawing Sheets

DEVICES AND METHODS FOR POSITIONING TOWS IN MARINE SEISMIC SYSTEMS

BACKGROUND

This section provides background information to facilitate a better understanding of the various aspects of the invention. It should be understood that the statements in this section of this document are to be read in this light, and not as admissions of prior art.

The invention relates in general to marine seismic systems and in particular to devices and methods for positioning tows (e.g., seismic streamer or seismic source) in the water relative to the tow vessel and one another to efficiently conduct marine seismic surveys and to acquire accurate and high quality seismic data.

Marine seismic exploration investigates and maps the structure and character of subsurface geological formations underlying a body of water. For large survey areas, seismic vessels tow one or more seismic sources and multiple seismic streamer cables through the water. The seismic sources typically comprise compressed air guns for generating acoustic pulses in the water. The energy from these pulses propagates downwardly into the geological formations and is reflected upwardly from the interfaces between subsurface geological formations. The reflected energy is sensed with hydrophones attached to the seismic streamers, and data representing such energy is recorded and processed to provide information about the underlying geological features.

Three-dimensional (3-D) seismic surveys of a grid gather data utilized to generate geophysical maps of subsurface formations that include longitudinal, lateral and depth information. Four-dimensional (4-D) mapping utilizes two or more 3-D seismic surveys conducted over time to reveal changes in the subsurface formations over time, for example, by the extraction of oil and gas. Since the grid is often much wider than the towed streamer array, the tow vessel must turn around and tow the streamer array in laps across the grid, being careful not to overlap or leave large gaps between the laps across the grid. The quality of the data recorded by the streamer receivers and the quality of the 3-D or 4-D geophysical images is dependent on how accurately the tow members (e.g., source equipment and streamers) are positioned. In this context, the term positioned refers to how each tow member is positioned relative to the other tow members, for example in the in-line (i.e., longitudinal) and the cross-line (i.e., lateral) directions.

There is a continuing desire to acquire accurate, high quality seismic data efficiently. According to one or more aspects of the disclosure, it is a desire to provide a system and method for deploying and positioning marine seismic tows. According to one or more aspects of the disclosure, it is a desire to provide a system and method for deploying seismic tows from a common carrier rope and facilitating independent positioning of one or more of the seismic tows relative to one or more of the other seismic tows.

SUMMARY

According to one or more aspects of the invention, a method for performing a marine seismic survey comprises deploying into the water from a tow vessel a carrier rope having an outer deflector urging the carrier rope laterally relative to the path of the moving tow vessel; positioning a first seismic streamer in the water from the deployed carrier rope; positioning a second seismic streamer in the water from the deployed carrier rope laterally-spaced from the first seismic streamer; towing the laterally-spaced seismic streamers from the carrier rope over a survey area; and conducting marine seismic survey operations while towing the laterally spaced seismic streamers over the survey area.

An embodiment, according to one or more aspects of the invention, of a system for deploying and positioning seismic streamers in the water to conduct marine seismic surveys comprises a carrier rope having an outer deflector to create, when deployed from a towing vessel, a sideways force to urge the deployed carrier rope laterally away from the path of the towing vessel; and a first seismic streamer having a streamer-connector adapted to moveably attach the first seismic streamer to the carrier rope, thereby to deploy the first seismic streamer from a location on the deployed carrier rope.

A method according to one or more aspects of the invention comprises deploying from a tow vessel into water a carrier rope comprising an outer deflector urging the carrier rope laterally away from the path of the moving tow vessel; attaching a first seismic streamer via a first streamer-connector to the deployed carrier rope; and moving the first streamer-connector along the deployed carrier rope to a location between the tow vessel and the outer deflector.

The foregoing has outlined some of the features and technical advantages of the invention in order that the detailed description of the invention that follows may be better understood. Additional features and advantages of the invention will be described hereinafter which form the subject of the claims of the invention.

BRIEF DESCRIPTION OF THE DRAWINGS

The invention is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
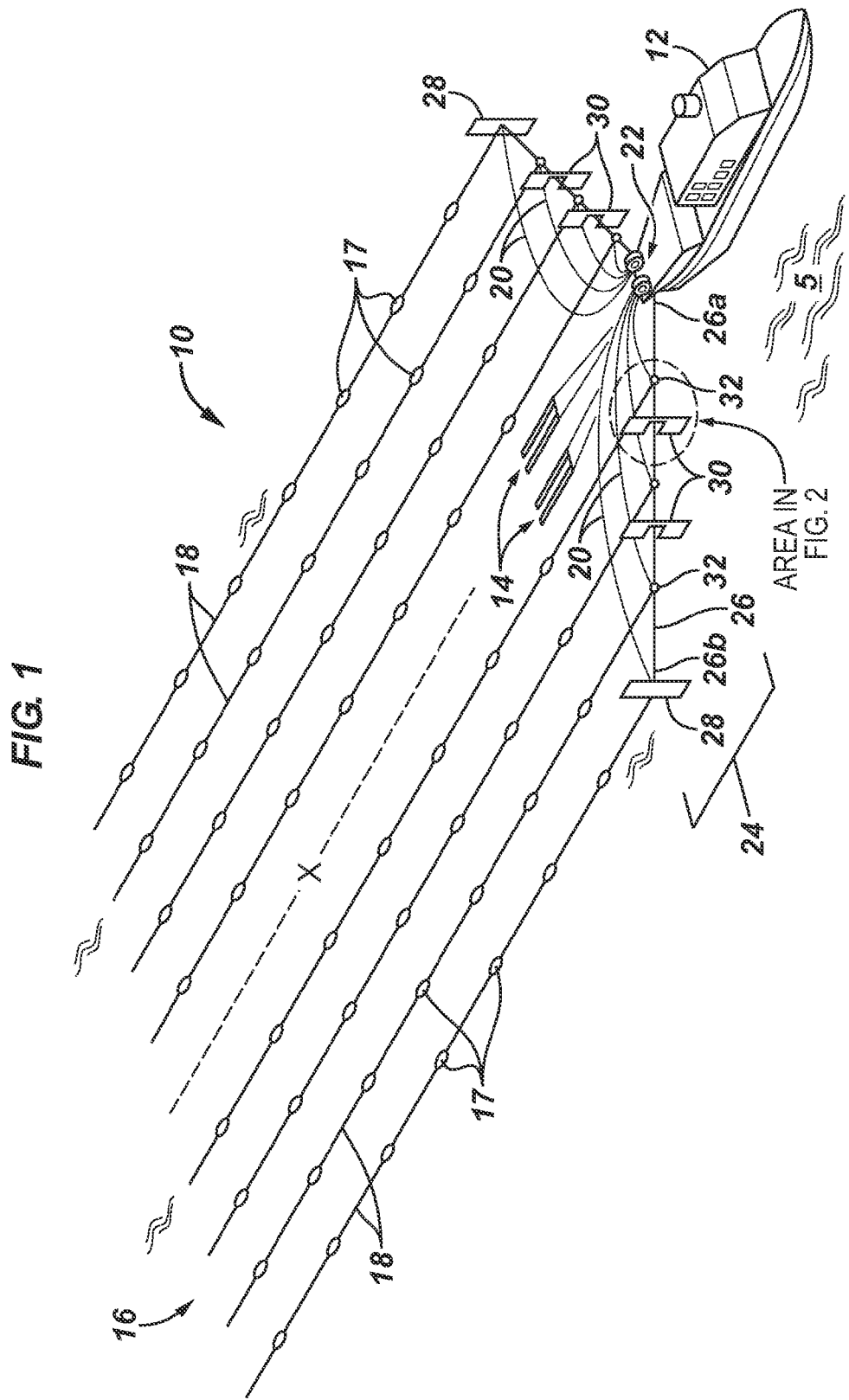
FIG. 1 is a perspective view of a marine seismic survey system according to one or more aspects of the invention.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Marine seismic systems comprise several seismic tows which are pulled behind a tow vessel. The seismic tows can include seismic streamers and/or seismic sources. Seismic streamers may be several thousand meters long and contain a large number of sensors, which are distributed along the length of each seismic streamer. The seismic streamers are deployed in a laterally spaced apart relationship to one another which can be referred to as a cross-line direction for example relative to a longitudinal axis of the towed system in the direction of travel of the tow vessel. Streamer arrays utilized deflectors (e.g., wings or doors) to pull the seismic streamers outwardly form the direct path behind the seismic tow vessel to maintain the transverse or cross-line spacing between the individual streamers. In response to being towed through the water, the deflectors create hydrodynamic lift pulling the seismic streamers outwardly and to maintain the cross-line position relative to the tow vessel path. Similarly, in some embodiments, the seismic source arrays may be spaced laterally apart from one another and laterally positioned relative to the tow vessel and/or seismic streamers.

The seismic sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones). In response to the detected seismic events, the sensors generate electrical signals to produce seismic data. Analysis of the seismic data can then indicate the presence or absence of probable locations of hydrocarbon deposits. Similarly, electromagnetic (EM) surveying can use EM sources and receivers. One type of EM surveying is referred to as controlled source EM surveying (CSEM), in which an EM transmitter is used to generate EM signals that are propagated into the subterranean structure. Subterranean elements reflect the EM signals, with the reflected EM signals received by the EM receivers.

For the case of multi-component seismic sensors, each sensor may be capable of detecting a pressure wavefield and at least one component of a particle motion that is associated with acoustic signals that are proximate to the multi-component seismic sensor. Examples of particle motions include one or more components of a particle displacement, one or more inline (x), crossline (y) and vertical (z) components of a particle velocity and one or more components of a particle acceleration. An example of a commercial multi-component system designed for ocean-bottom (also known as seabed) applications is WesternGeco's Q-SEABED system.

Depending on the particular embodiment, the multi-component seismic sensor may include one or more hydrophones, geophones, particle displacement sensors, particle velocity sensors, accelerometers, pressure gradient sensors, or combinations thereof. For example, in accordance with some embodiments, a particular multi-component seismic sensor may include a hydrophone for measuring pressure and three orthogonally-aligned accelerometers to measure three corresponding orthogonal components of particle velocity and/or acceleration near the seismic sensor. It is noted that the multi-component seismic sensor may be implemented as a single device or may be implemented as a plurality of devices, depending on the particular embodiment. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the cross-line direction, and another one of the pressure gradient sensors may acquire, at a particular point, seismic data indicative of the pressure data with respect to the inline direction.

FIG. 1 is a perspective view of a marine seismic system, generally referred to by the numeral 10, according to one or more aspects of the invention. Depicted system 10 comprises a tow vessel 12, such as described in our patent appl. no. PCT/GB98/01832 (WO 99/00295), and U.S. Pat. No. 6,216,627. Tow vessel 12 is depicted towing a seismic source 14, for example a TRISOR multiple air gun source of the kind described in our U.S. Pat. No. 4,757,482; and an array 16 of eight seismic streamers 18 carrying seismic sensors 17 for recording the seismic data. It will be appreciated by those skilled in the art with benefit of this disclosure that, in practice, many more than eight streamers or fewer than eight streamers can be towed. In the depicted embodiments, each of the seismic streamers 18 is being towed by a respective lead-in cable 20 (e.g., a high strength steel or fiber-reinforced electrical or electro-optical cables which convey electrical power, control and data signals between tow vessel 12 and streamers 18) which can be attached to tow vessel 12 via winches 22.

According to one or more aspects of the invention, streamer array 16 is deployed and positioned in the water utilizing an apparatus referred to generally as deployment system 24 for purposes of identification herein. Deployment system 24 includes a pair of carrier ropes 26 (e.g., wire rope, cable, tether, etc.) each having a first end 26a connected to tow vessel 12, for example, via winches 22, and the second, distal end 26b positioned laterally away from tow vessel 12 and the path "X" of moving tow vessel 12. As understood by those skilled in the art, deployment system 24 traditionally comprises two substantially identical halves extending respectively to the port and the starboard sides of path "X." For purposes of brevity, deployment system 24 is described with reference to one side of streamer array 16. Deployment system 24 comprises a carrier rope 26 adapted to be deployed from tow vessel 12 into the water 5, an outer deflector 28 urging the deployed carrier rope 26 laterally away from the tow vessel, and one or more seismic tows (e.g., streamers 18, sources 14) moveably deployed from the deployed carrier rope. The invention will be described for the purpose of brevity herein with reference primarily to deploying, towing, and positioning seismic streamers. It is understood that deployment system 24 is intended, in one or more aspects, for deploying, towing, and positioning seismic sources.

As will be understood with the further description of the invention below, deflectors 28, 30, and 48 (FIG. 5) can comprise one or more types of deflectors. For example, the depicted deflectors can include a so called wing deflector, e.g., the WesternGeco MONOWING disclosed for example in our U.S. Pat. No. 5,357,892, or a so called door-type deflector, frequently called a door or a Barovane comprising a series of hydrofoils mounted within a rectangular frame. As will be understood by those skilled in the art, deployment system 24 may comprise a combination of different types of deflectors. The deflectors may be active or passive, where active refers to the ability to remotely control position, or steer the deflector. An actuator may be disposed with the deflecting member or deflector, wherein a controller sends a signal to the actuator, and wherein the actuator moves a control surface, such as a wing, to provide an angle of attack to achieve a desired lift. The actuator may employ a motive force selected from pneumatic, electric and hydraulic. The body and the actuator may be made of a material selected from metal, composite and combinations thereof, such as a metal skin covering a foam core, wherein the metal skin is selected from titanium, stainless steel, and the like. In systems of the invention employing wing-type deflectors, the total area of the wing may range for example from about 1 to about 30 square meters. Systems wherein one or more deflectors and/or deflecting members are in a generally vertical arrangement or a generally horizontal arrangement are considered within the invention.

According to one embodiment, carrier rope 26 includes an outer deflector 28 connected proximate to distal end 26b and one or more intermediate deflectors (e.g., deflector 30 in FIGS. 1-4, and deflector 48 in FIGS. 5-7) positioned at locations on carrier rope 26 between distal end 26b and tow vessel 12. As the deployed carrier rope 26 is towed through the water, deflectors 28, 30 produce a sideways force (e.g., lateral to tow vessel 12), referred to as lift, which urges carrier rope 26 and the attached tows (e.g., streamers 18, sources 14) laterally away from tow vessel 12. In the depicted embodiments, one or more of seismic streamers 18 are moveably deployed from deployed carrier rope 26 facilitating selective positioning of the deployed seismic streamers 18 relative to one another and/or tow vessel 12. For example, seismic streamers 18 are moveably connected to carrier rope 26 such that seismic streamers 18 can be deployed from one or more locations on the deployed carrier rope 26. Further deployment system 24, provides for independent deployment and/or positioning of various elements. For example, according to one aspect, seismic streamers 18 can be deployed and positioned independent of deploying carrier rope 26. In other words, carrier rope 26 can be introduced into water 5 (e.g., deployed) without deploying seismic streamers 18 into the water. In this example, carrier rope 26 is deployed into the water and urged laterally away from tow vessel 12 (e.g., path X) in response to outer deflector 28 being towed through the water on carrier rope 26. Then, seismic streamers 18 can be deployed in water 5 from the carrier rope 26 and selectively positioned. As will be further understood, one or more seismic streamers 18 can be moved relative to carrier rope 26 independent and/or separate from movement of one or more of the other seismic streamers.

With reference to the embodiment depicted in FIG. 1, outer deflector 28 can be fixedly connected to carrier rope 26 such that it is stationary relative to a point, for example distal end 26b, of carrier rope 26. Intermediate deflectors 30 are deployed along carrier rope 26 in a spaced apart relationship. Intermediate deflectors 30 are connected to carrier rope 26 in a manner that allows for the moveable streamers 18 to be moved on carrier rope 26 from one side of the intermediate deflectors 30 to the other side (e.g., bypassing the intermediate deflectors).

Figure 2:
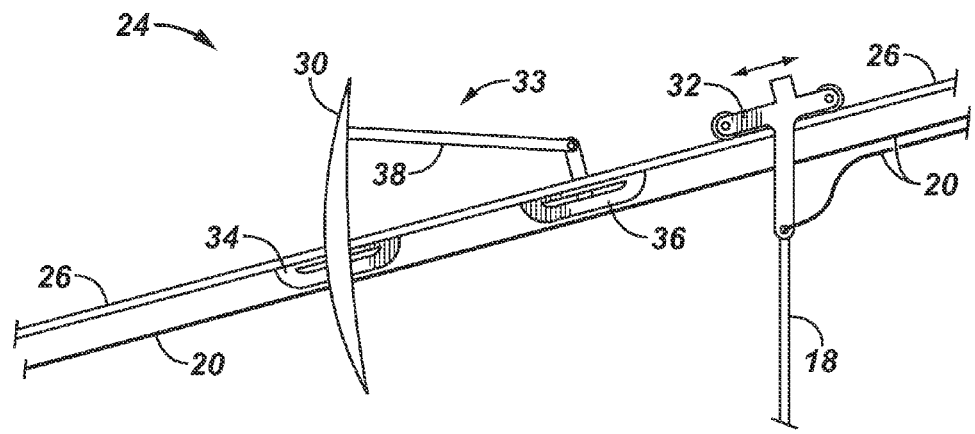
FIG. 2 is an expanded view of a portion of the deployment system indentified by the box in FIG. 1 illustrating a movable attachment of a seismic tow to the deployed carrier rope.

FIG. 2 is an expanded view of a portion of deployment system 24, indicated by the box in FIG. 1, illustrating an embodiment of a moveable connection of a seismic streamer 18 to carrier rope 26. In the depicted embodiment, seismic streamer 18 is attached to carrier rope 26 by a streamer-connector 32 providing laterally movement along carrier rope 26 as shown by the arrow. Depicted intermediate deflector 30 is fixedly attached to carrier rope 26 by a deflector-connector, generally referred to by the numeral 33. Streamer-connector 32 and deflector-connector 33 are cooperative, thereby facilitating movement of streamer-connector 32 along carrier rope 26 from one side of deflector-connector 33 to the other. For example, with reference to FIG. 1, each of the seismic streamers 18 can be moved laterally along carrier rope 26, for example by operation of winches 22 and lead-in cables 20. The ability to independently move individual seismic streamers 18 provides flexibility and efficiency to system 10 for example by providing the ability to change (e.g., reposition) the spacing between the streamers 18 of array 16 and/or by changing the number of streamers 18 deployed. In another example, equipment failure in a seismic streamer 18 can be more easily addressed without having to retrieve all of the seismic streamers on a side of the streamer array 16. As will be understood by those skilled in the art with benefit of the present disclosure, deployment system 24 may facilitate utilizing smaller outside deflectors 28 and/or intermediate deflectors 30 than in a contemporary system.

In the embodiment depicted in FIG. 2, intermediate deflector 30 can be referred to as an active deflector, wherein the angle of attack, and thus the hydrodynamic lift created, can be changed. In this embodiment, deflector-connector 33 comprises a pair of spaced apart connector members 34, 36. First deflector-connector member 34 is located at intermediate deflector 30 and provides pivotal movement of intermediate deflector 30 so that the angle of attack of intermediate deflector 30 can be changed to provide the desired hydrodynamic lift. The second deflector-connector member 36 is attached to carrier rope 26 a distance spaced from deflector-connector member 34. A rod 38 (e.g., boom) is operationally connected between intermediate deflector 30 and deflector-connector member 36 for adjusting the angle of attack of deflector 30. Intermediate deflector 30 can be suspended beneath a float so as to be completely submerged and positioned generally vertically in the water. It will be recognized by those skilled in the art with benefit of this disclosure that deflector-connector 33 is not limited to the embodiment depicted in FIG. 2 and may comprise one or more members. For example, in one embodiment, deflector-connector members 34, 36 may comprise a single member.

Figure 3:
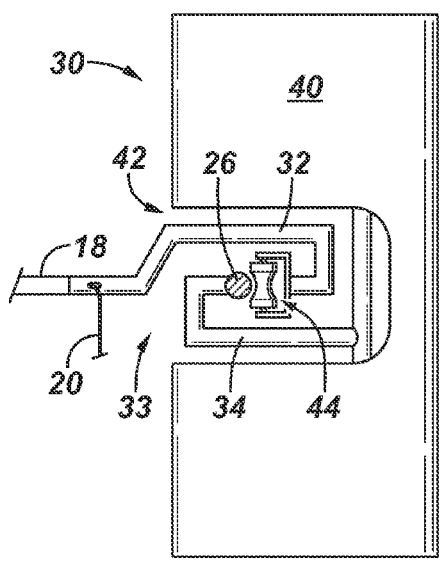
FIG. 3 is a schematic, elevation view of an embodiment of an intermediate deflector according to one or more aspects of the invention attached to the carrier rope.

FIG. 3 is a schematic, elevation view of an embodiment of an intermediate deflector 30 according to one or more aspects of the invention. The depicted intermediate deflector 30 is described as a wing-type deflector having a deflector member 40 (e.g., wing). Intermediate deflector 30 comprises a passage 42 (e.g., opening), which is formed through deflector member 40 in this embodiment. Carrier rope 26 can be disposed through passage 42 locating carrier rope 26 proximate to the lift point of intermediate deflector 30 which may avoid or reduce the occurrence of kinks in carrier rope 26.

An exemplary embodiment of cooperative streamer-connector device 32 and deflector-connector 33 is depicted in FIG. 3. In this embodiment, deflector-connector 33 comprises deflector-connector member 34 and may comprise one or more other connector members, such as deflector-connector member 36 depicted in FIG. 2. According to one or more aspects of the invention, the cooperative streamer-connector 32 and deflector-connector member 34 have elbow shaped configurations. Referring back to FIG. 2, deflector-connector member 34 and deflector-connector member 36 may have an elbow shaped configuration. In the depicted embodiment, deflector-connector member 34 contacts and attaches to carrier rope 26 from a first side and streamer-connector device 32 contacts carrier rope 26 from a second side. Streamer-connector 32 can include a reduced friction portion 44 for slidably disposing (e.g., connecting) to carrier rope 26. In the illustrative embodiment of FIG. 3, reduced friction portion 44 is depicted as a rotating wheel. As will be understood by those skilled in the art, various physical connections, devices and configurations can be utilized to provide the moveably attachment of seismic streamer 18 relative to carrier rope 26 and intermediate deflector 30.

Figure 4:
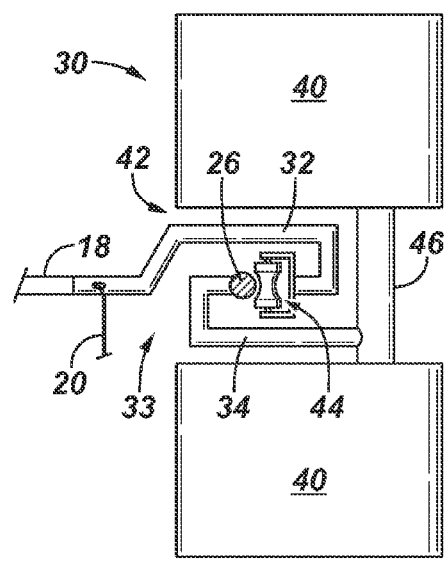
FIG. 4 is a schematic, elevation view of another embodiment of an intermediate deflector according to one or more aspects of the invention.

FIG. 4 is a schematic, elevation view of another embodiment of an intermediate deflector 30 according to one or more aspects of the invention. In this embodiment, intermediate deflector 30 comprises at least two deflector members 40 providing a passage 42 through which carrier rope 26 passes. In the depicted embodiment, deflector members 40 are separated by a body 46 and the passage 42 is formed between the two depicted deflector members 40. Depicted deflector-connector device 34 comprises at least one bracket 34. Seismic streamer 18 is slidably connected to carrier rope 26 via streamer-connector device 32 in a manner such that seismic streamer 18 can bypass intermediate deflector 30 (e.g., deflector-connector member 34) as seismic streamer 18 is moved laterally along carrier rope 26 to the desired position for deployment.

An illustrative method of conducting a seismic survey according to one or more aspects of the invention is now described with reference to FIGS. 1-4. A carrier rope 26 comprising an outer deflector 28 located proximate to its distal end 26b and one or more intermediate deflectors 30 is deployed from tow vessel 12, for example via winches 22. In response to towing carrier rope 26 through the water, outer deflector 28 and intermediate deflectors 30 of this embodiment urge carrier rope 26 laterally outward from tow vessel 12. Seismic streamers 18 are moveably attached to the deployed carrier rope 26 (e.g., by streamer-connector 32) and moved laterally outward from tow vessel 12 to locations on carrier rope 26 from which they are deployed to form the desired streamer array 16 (e.g., cross-line spacing).

According to one or more aspects of the invention, carrier rope 26 is deployed into the water prior to deploying one or more of seismic streamers 18 from the deployed carrier rope 26. When being located to a deployment location on carrier rope 26, one or more of the seismic streamers 18 (e.g., streamer-connector) pass across one or more of the intermediate deflectors 30 on carrier rope 26. For example, with reference to FIG. 1, a first seismic streamer 18 is slidably attached to carrier rope 26 by streamer-connector device 32. A lead-in cable 20 attached to first streamer-connector 32 is deployed from tow vessel 12, (e.g., by winches 22) allowing streamer-connector 32 to move laterally along carrier rope 26 across the intermediate deflectors 30 to a desired location, for example proximate to outer deflector 28, from which that seismic streamer is deployed. A second seismic streamer 18 can then be similarly moved to a desired deployment location on carrier rope 26 laterally spaced from the first seismic streamer 18. Additional seismic streamers 18 can be similarly positioned along carrier rope 26 to form seismic streamer array 16 having a desired number of streamers and spacing between adjacent streamers. Marine seismic survey operations are conducted while towing seismic streamer array 16 through the water and across the survey away. Conducting seismic survey operations may comprise firing seismic sources 14 and generating seismic waves which propagate through the water into subsurface geological formations. The seismic waves scattered by the geological formations are received by sensors 17 carried by seismic streamers 18 and recorded as seismic data.

While conducting marine seismic operations, one or more of seismic streamers 18 can be repositioned along carrier rope 26 for example to change the cross-line spacing between streamers. While towing seismic streamer array 16, one or more of the deployed seismic streamers 18 can be retrieved to tow vessel without having to retrieve carrier rope 26 and/or all of the seismic streamers 18 deployed on one or both sides of tow vessel 16. For example, while conducting a marine seismic survey a failure occurs in the second streamer 18 from tow vessel 12 on the port side of seismic streamer array 16. According to one or more aspects of the invention, the inside port streamer 18 closest to tow vessel 12 and the malfunctioning second port side streamer 18 can be retrieved without retrieving carrier rope 26 and/or retrieving any of the seismic streamers 18 positioned at least between outer deflector 28 and the identified second port side streamer 18. In a contemporary system, the port side of seismic array 16 would have to be retrieved to repair the malfunctioning streamer. Utilizing the invention the malfunctioning streamer can be retrieved and repaired while survey operations continue. The remaining deployed seismic streamers 18 can, if desired, be repositioned to provide a desired cross-line spacing accounting for the retrieved seismic streamer(s), or one or more replacement streamers 18 an be deployed and positioned along carrier rope 26. Thus, system 10 provides flexibility so that quality seismic data can be obtained in an efficient manner.

Figure 5:
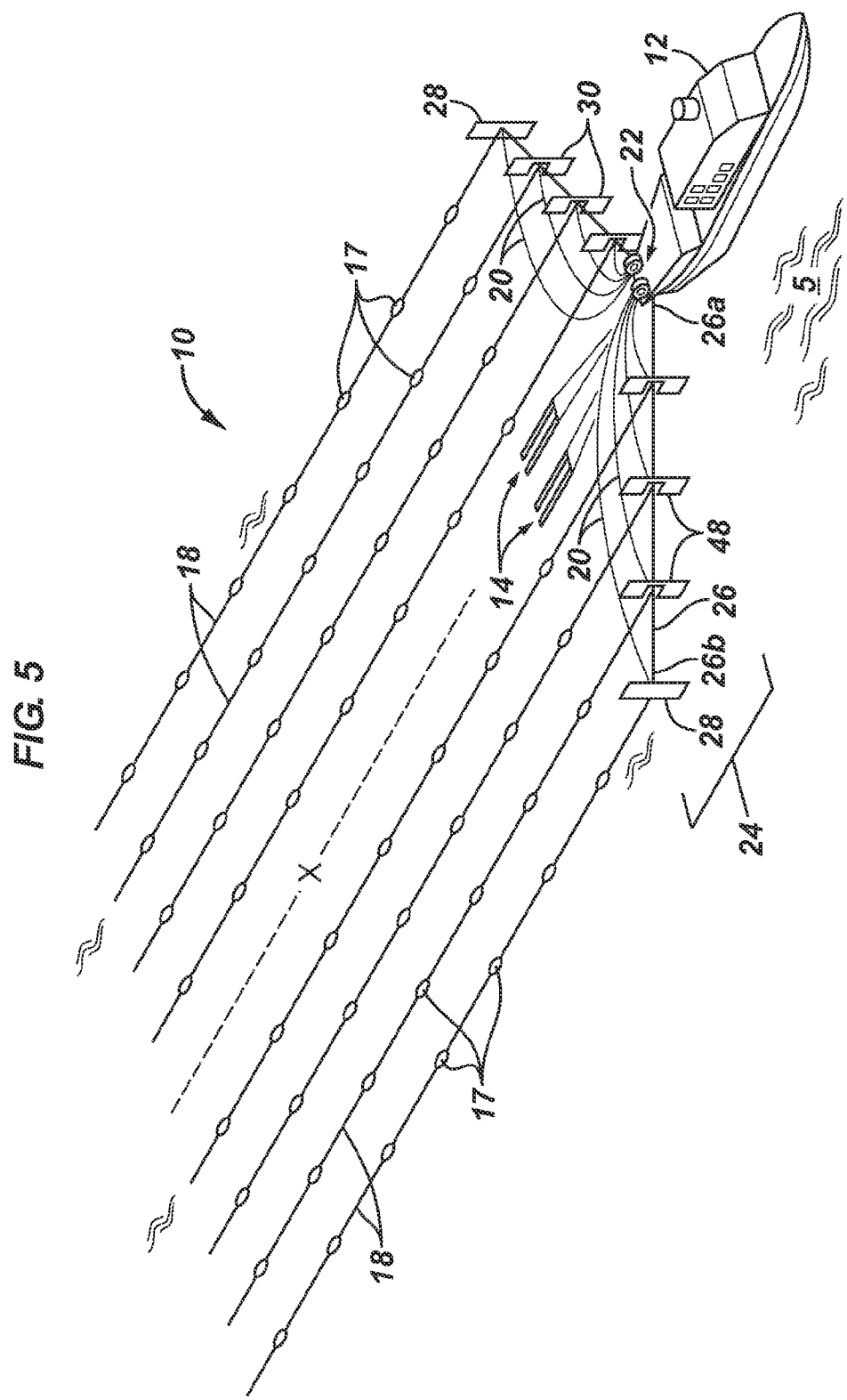
FIG. 5 is a schematic, perspective view of another embodiment of a marine seismic survey system according to one or more aspects of the invention.

FIG. 5 is a schematic, perspective view of another embodiment of a marine seismic system 10 according to one or more aspects of the invention. Depicted system 10 comprises a deployed carrier rope 26 extending from a first end 26a at tow vessel 12 to a distal, second end 26b. An outer deflector 28 located proximate to distal end 26b pulls carrier rope 26 laterally away from tow vessel 12 and the path of travel in response to being towed through the water. Seismic streamer array 16 is formed by deploying laterally spaced seismic streamers 18, referred to from time to time herein as intermediate streamers, from deployed carrier rope 26. In the depicted embodiment, each intermediate seismic streamer 18 is moveably (e.g., slidably) disposed on carrier rope 26 by a streamer-connector 48. In the depicted embodiment, streamer-connector 48 is a lead-in deflector. According to one or more aspects of the invention, lead-in deflector 48 may combine one or more aspects of deflector-connector 32 and intermediate deflector 30, described above with reference to FIGS. 1-4.

In one embodiment, an outer deflector 28 positioned proximate to the distal end of carrier rope 26 is deployed into water 5 urging carrier rope 26 laterally outward from the moving tow vessel 12. Depicted streamer array 16 comprises outer most streamers 18 that are positioned proximate to the distal ends 26b and outer deflectors 28. According to one or more embodiments, the outer most streamers can be deployed simultaneous with outer deflector 28 and carrier rope 26 or at a later time. In some embodiments, the outer most streamer 18 is positioned a distance from distal end 26b and outer deflector 28 as opposed to being located proximate to distal end 26b.

When carrier rope 26 is deployed, intermediate seismic streamers 18 can be deployed from tow vessel 12 to the desired position along carrier rope 26. For example, a first intermediate streamer 18 is slidably connected to carrier rope 26 via lead-in deflector 48. Lead-in cable 20, connected to lead-in deflector 48, is deployed from tow vessel 12 (e.g., by winches 22). Lead-in deflector 48 moves outward along carrier rope 26 in response to being towed through the water (e.g., hydrodynamic lift). Lead-in deflector 48 and the connected seismic streamer 18 can be stopped in the desired deployment location on carrier rope 26, for example by operation of winches 22 and/or a physical stopping device. As described above, lead-in deflector 48 promotes efficient deployment of intermediate streamers 18 as well as facilitating independent and efficient control of each of the intermediate streamers during operations. The seismic streamers can be positioned (e.g., cross-line, relative to tow vessel 12) to form a desired array 16 by selecting the deployment location on carrier 26 and by the number, size, and/or angle of attack of the utilized deflectors.

Figure 6:
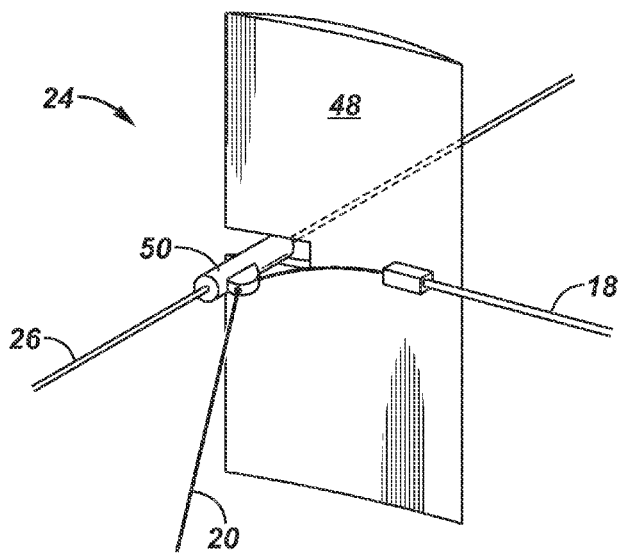
FIG. 6 is an expanded view an embodiment of a connection of a lead-in deflector to a carrier rope.

Refer now to FIG. 6, wherein an expanded view of an embodiment of a moveable connection of a lead-in deflector 48 (e.g., streamer-connector) to carrier rope 26 is depicted. Lead-in deflector 48 is moveably attached to carrier rope 26 by a connector-member 50, described herein as a collar. In the depicted embodiment, connector 50 provides free movement of lead-in deflector 48 along carrier rope 26 via the tension in carrier rope 26 and seismic streamer 18. In the embodiment of FIG. 6, tension in lead-in cable 20 can be utilized to control the free movement of lead-in deflector 48 along carrier rope 26 and for stopping lead-in deflector 48 at a desired deployment location relative to the carrier rope 26. Referring back to FIG. 5, lead-in cable 20 can be deployed and retrieved from tow vessel 12, for example by winches 22.

Figure 7:
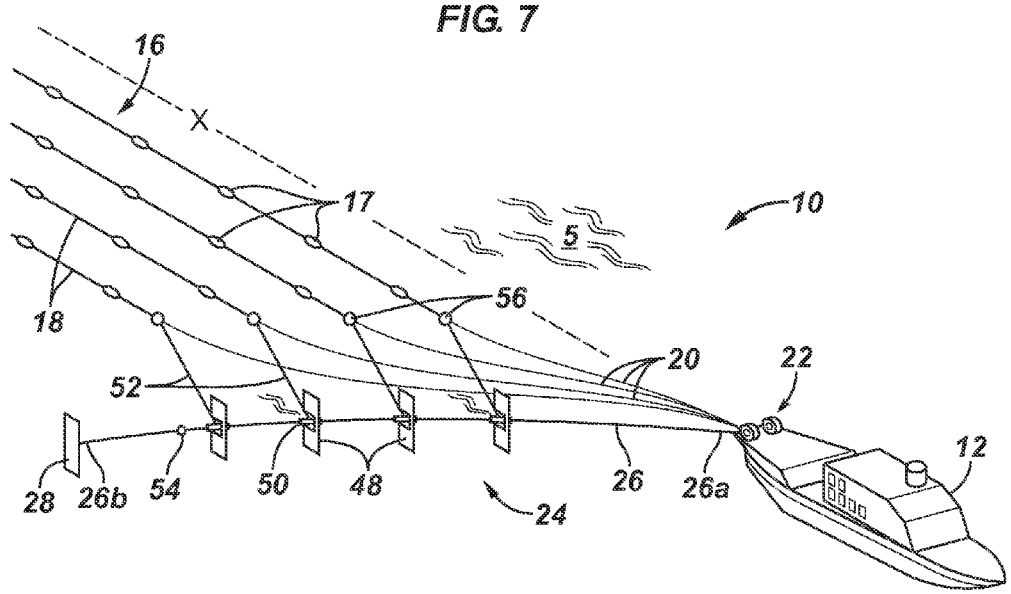
FIG. 7 is a schematic, perspective view of another embodiment of a marine seismic survey system according to one or more aspects of the invention.

FIG. 7 is a schematic, perspective view of another embodiment of a marine seismic survey system 10 according to one or more aspects of the invention. Depicted system 10 comprises a carrier rope 26 deployed into water 5 from tow vessel 12 via an outside deflector 28 positioned proximate to the distal end 26b of the carrier rope 26. In this embodiment, seismic streamers 18 are deployed into water 26 longitudinally from tow vessel 12 and each seismic streamer 18 is deployed and/or positioned laterally (e.g., cross-line) from deployed carrier rope 26 in a spaced apart array 16.

In this embodiment, each of the depicted seismic streamers 18 is attached to carrier rope 26 by a respective lead-in deflector 48, such as disclosed in FIGS. 5 and 6, which is moveably connected to deployed carrier rope 26. A streamer lead 52 (e.g., wire, rope, cable, etc.) is connected between each lead-in deflector 48 and its respective seismic streamer 18. Streamer leads 52 are depicted connected to the front end of each of the respective streamers 18, for example at device 56. According to one embodiment, device 56 is a deflector. In some embodiments, device 56 is a collar.

In the embodiment of FIG. 7, lead-in deflectors 48 are moveably attached to deployed carrier rope 26 and lead-in deflectors 48 are not connected to tow vessel 12 by lead-in cables 20 as depicted in the other embodiments. In this embodiment, at least one deflector stop 54 is proved at a location on carrier rope 26. The outer most deflector lead-in 48 is moveably attached to deployed carrier rope 26 and deployed into water 5, laterally moving on carrier rope 26 away from tow vessel 12 until halted by deflector stop 54. From this position, deflector lead-in 48 urges its carried seismic streamer 18 laterally away from tow vessel 12 in response to being towed through the water. The other seismic streamers 18 and lead-in deflectors 48 are similarly deployed from carrier rope 26. In the depicted embodiment, connector 50 (FIG. 6) of each lead-in deflector 48 is adapted to provide sufficient distance between the adjacent lead-in deflectors 48 to ensure sufficient lift generation.

The foregoing outlines features of several embodiments so that those skilled in the art may better understand the aspects of the invention. Those skilled in the art should appreciate that they may readily use this disclosure as a basis for designing or modifying other processes and structures for carrying out the same purposes and/or achieving the same advantages of the embodiments introduced herein. Those skilled in the art should also realize that such equivalent constructions do not depart from the spirit and scope of the invention, and that they may make various changes, substitutions and alterations herein without departing from the spirit and scope of the invention. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A method for performing a marine seismic survey, comprising:
    deploying into the water from a tow vessel a carrier rope comprising an outer deflector urging the deployed carrier rope laterally relative to the path of the moving tow vessel;
    positioning a first seismic streamer in the water from the deployed carrier rope, wherein a first streamer-connector moveably connects the first seismic streamer to the deployed carrier rope and the positioning comprises moving the first streamer-connector laterally along the deployed carrier rope;
    positioning a second seismic streamer in the water from the deployed carrier rope laterally-spaced from the first seismic streamer, wherein a second streamer-connector moveably connects the second seismic streamer to the deployed carrier rope and the positioning comprises moving the second streamer-connector laterally along the deployed carrier rope;
    towing the laterally-spaced seismic streamers from the carrier rope over a survey area;
    repositioning one of the first seismic streamer and the second seismic streamer while towing the first seismic streamer and the second seismic streamer from the carrier rope over the survey area, the repositioning comprising moving the one of the first seismic streamer and the second seismic streamer laterally along the deployed carrier rope independent of movement of the other of the first seismic streamer and the second seismic streamer along the deployed carrier rope; and
    conducting marine seismic survey operations while towing the laterally spaced seismic streamers over the survey area.

2. The method of claim 1, wherein:
    the carrier rope comprises an intermediate deflector attached between the tow vessel and the outer deflector; and
    the positioning the first seismic streamer from the deployed carrier rope comprises moving the first streamer-connector along the carrier rope across the attached intermediate deflector to a location between the intermediate deflector and the outer deflector.

3. The method of claim 1, wherein the first streamer-connector and the second streamer-connector are disposed on the carrier rope.

4. The method of claim 1, wherein the first streamer-connector comprises a lead-in deflector, and the positioning the first seismic streamer from the deployed carrier rope comprises:
    moving the lead-in deflector along the deployed carrier rope to a desired location from which the first seismic streamer is positioned.

5. The method of claim 4, wherein the moving the lead-in deflector along the deployed carrier rope comprises deploying from the tow vessel a lead-in cable attached to the lead-in deflector.

6. The method of claim 4, wherein the moving the lead-in deflector along the deployed carrier rope comprises blocking movement of the lead-in deflector in the direction laterally away from the tow vessel in response to contacting a stop device disposed on the deployed carrier rope.

7. The method of claim 4, wherein:
the carrier rope comprises an intermediate deflector attached between the tow vessel and the outer deflector; and
the positioning of the first seismic streamer comprises moving the lead-in deflector along the deployed carrier rope from a position between the tow vessel and the intermediate deflector to a position between the intermediate deflector and the outer deflector.

8. The method of claim 1, wherein the first streamer-connector comprises:
a lead-in deflector; and
a streamer lead connecting the first seismic streamer to the lead-in deflector.

9. A system for independently deploying and positioning seismic streamers in the water to conduct marine seismic surveys, the system comprising:
a carrier rope comprising an outer deflector to create, when deployed from a towing vessel, a sideways force to urge the deployed carrier rope laterally away from the path of the towing vessel;
a first seismic streamer comprising a streamer-connector to moveably attach the first seismic streamer to the deployed carrier rope, thereby to independently position the first seismic streamer from a location on the deployed carrier rope; and
a second seismic streamer comprising a second streamer-connector to moveably attach the second seismic streamer to the carrier rope, thereby to independently position the second seismic streamer from the deployed carrier rope;
wherein each of the first streamer-connector and the second streamer-connector can be moved on the deployed carrier rope independent and separate of the movement of the other of the first streamer-connector and the second streamer-connector thereby facilitating independent positioning of the first seismic streamer and the second seismic streamer from the deployed and towed carrier rope.

10. The system of claim 9, wherein the carrier rope further comprises an intermediate deflector attached to the carrier rope between the outer deflector and the towing vessel to create a sideways force to urge the deployed carrier rope laterally away from the path of the towing vessel.

11. The system of claim 9, wherein the carrier rope further comprises an intermediate deflector attached by a deflector-connector to the carrier rope to create in use a sideways force to urge the deployed carrier rope laterally away from the path of the towing vessel, wherein the deflector-connector is cooperative with the first streamer-connector to move the first streamer-connector along the deployed carrier rope and across the attached deflector-connector.

12. The system of claim 9, wherein the first streamer-connector comprises a lead-in deflector to create in use a sideways force to urge the first seismic streamer laterally relative to the path of the towing vessel.

13. The system of claim 12, further comprising a stop device attached to the carrier rope in use to block further movement of the lead-in deflector along the deployed carrier rope in the direction laterally away from the path of the towing vessel.

14. A method, comprising:
deploying into the water from a tow vessel a carrier rope comprising an outer deflector urging the deployed carrier rope laterally relative to the path of the moving tow vessel;
deploying a first seismic streamer in the water from the deployed carrier rope, wherein a first streamer-connector moveably connects the first seismic streamer to the deployed carrier rope;
deploying a second seismic streamer in the water from the deployed carrier rope, wherein a second streamer-connector moveably connects the second seismic streamer to the deployed carrier rope; and
positioning one of the first seismic streamer and the second seismic streamer while towing the carrier rope, the positioning comprising moving the one of the first seismic streamer and the second seismic streamer laterally along the deployed carrier rope independent of movement of the other of the first seismic streamer and the second seismic streamer along the deployed carrier rope.

15. The method of claim 14, wherein the first streamer-connector and the second streamer-connector are located on the carrier rope.

16. The method of claim 14, comprising moving one of the first streamer-connector and the second streamer-connector on the carrier rope from a position between the tow vessel and an intermediate deflector located on the carrier rope to a position between the outer deflector and the intermediate deflector.

17. The method of claim 14, comprising moving one of the first streamer-connector and the second streamer-connector on the carrier rope from a position between the outer deflector and an intermediate deflector located on the carrier rope to a position between the intermediate deflector and the tow vessel.

* * * * *